(12) United States Patent
Kieffel et al.

(10) Patent No.: US 9,899,125 B2
(45) Date of Patent: Feb. 20, 2018

(54) MEDIUM- OR HIGH-VOLTAGE ELECTRICAL APPLIANCE HAVING A LOW ENVIRONMENTAL IMPACT AND HYBRID INSULATION

(71) Applicant: Alstom Technology Ltd., Baden (CH)

(72) Inventors: Yannick Kieffel, Saint-Jean-de-Bournay (FR); Alain Girodet, Chassieu (FR); Jacques Porte, Lyons (FR)

(73) Assignee: ALSTOM TECHNOLOGY LTD, Baden (CH)

( * ) Notice: Subject to any disclaimer, the term of this patent is extended or adjusted under 35 U.S.C. 154(b) by 239 days.

(21) Appl. No.: 14/425,978

(22) PCT Filed: Sep. 9, 2013

(86) PCT No.: PCT/EP2013/068639
§ 371 (c)(1),
(2) Date: Mar. 4, 2015

(87) PCT Pub. No.: WO2014/037566
PCT Pub. Date: Mar. 13, 2014

(65) Prior Publication Data
US 2015/0228375 A1 Aug. 13, 2015

(30) Foreign Application Priority Data
Sep. 10, 2012 (FR) ..................................... 12 58437

(51) Int. Cl.
*H01B 3/56* (2006.01)
*H01H 33/22* (2006.01)
(Continued)

(52) U.S. Cl.
CPC .............. *H01B 3/56* (2013.01); *H01H 33/22* (2013.01); *H02B 7/01* (2013.01); *H02B 13/055* (2013.01); *H01H 2033/566* (2013.01)

(58) Field of Classification Search
None
See application file for complete search history.

(56) References Cited

U.S. PATENT DOCUMENTS

| | | | |
|---|---|---|---|
| 3,048,648 A | 8/1962 | Plump | |
| 4,547,316 A | 10/1985 | Yamauchi | |

(Continued)

FOREIGN PATENT DOCUMENTS

| | | |
|---|---|---|
| EP | 0 128 588 A1 | 12/1984 |
| EP | 0 131 922 A1 | 1/1985 |

(Continued)

OTHER PUBLICATIONS

Search Report issued in French Patent Application No. FR 12 58437 dated May 7, 2013.

(Continued)

*Primary Examiner* — Necholus Ogden, Jr.
(74) *Attorney, Agent, or Firm* — Pearne & Gordon LLP (57) ABSTRACT

The present invention relates to medium- or high-voltage equipment having low environmental impact, including a leaktight enclosure in which there are located electrical components covered with a solid dielectric layer of varying thickness and a gaseous medium for providing electrical insulation and/or for extinguishing electric arcs that are likely to occur in said enclosure, and that comprises heptafluoroisobutyronitrile in a mixture with a dilution gas.

14 Claims, 2 Drawing Sheets

(51) Int. Cl.
  *H02B 13/055* (2006.01)
  *H02B 7/01* (2006.01)
  *H01H 33/56* (2006.01)

(56) References Cited

U.S. PATENT DOCUMENTS

| | | | |
|---|---|---|---|
| 2008/0135817 | A1 | 6/2008 | Luly |
| 2013/0292614 | A1 | 11/2013 | Tuma |
| 2014/0190726 | A1 | 7/2014 | Kieffel |
| 2014/0196932 | A1 | 7/2014 | Kieffel |
| 2014/0233159 | A1 | 8/2014 | Kieffel |
| 2015/0083979 | A1* | 3/2015 | Costello .................. H01B 3/24 252/571 |

FOREIGN PATENT DOCUMENTS

| | | |
|---|---|---|
| EP | 1 724 802 A2 | 11/2006 |
| FR | 1 265 731 A | 6/1961 |
| FR | 2 977 707 A1 | 1/2013 |
| FR | 2 983 340 A1 | 5/2013 |
| WO | 2008/073790 A2 | 6/2008 |
| WO | 2011/090992 A1 | 9/2011 |
| WO | 2012/080246 A1 | 6/2012 |
| WO | 2013/041697 A1 | 3/2013 |

OTHER PUBLICATIONS

Written Opinion issued in French Patent Application No. FR 12 58437 dated May 7, 2013.
International Search Report issued in Application No. PCT/EP2013/068639 dated Nov. 22, 2013.
Written Opinion issued in Application No. PCT/EP2013/068639 dated Nov. 22, 2013.

* cited by examiner

MEDIUM- OR HIGH-VOLTAGE ELECTRICAL APPLIANCE HAVING A LOW ENVIRONMENTAL IMPACT AND HYBRID INSULATION

TECHNICAL FIELD

The invention relates to the field of electrical insulation and electric arc extinction in medium- or high-voltage equipment, in particular in high-voltage equipment.

More particularly, the present invention relates to the use of hybrid insulation having low environmental impact in medium- or high-voltage equipment based on the combination of a gaseous medium comprising heptafluoroisobutyronitrile in a mixture with a neutral gas of the nitrogen, oxygen, carbon dioxide, or air type, or a mixture thereof, used as gas for electrical insulation and/or for electric arc extinction and for solid insulation of low dielectric permittivity applied in a layer of small or large thickness on the conductive parts subjected to an electric field that is greater than the breakdown field of the system without solid insulation. Since the thickness of the insulating layer is a function of the utilization factor of the electric field, $\eta$, defined as the ratio of the mean electric field (U/d) divided by the maximum electric field Emax ($\eta = U/(Emax*d)$), the layer is thick for utilization factors close to 0.3, while it is thin for utilization factors approaching 0.9.

The invention also relates to medium- or high-voltage equipment in which electric arc extinction is performed by a gaseous medium comprising heptafluoroisobutyronitrile in a mixture with a neutral gas of the nitrogen, oxygen, carbon dioxide, or air type, or a mixture thereof, and electrical insulation is provided by the same gas in combination with solid insulation of low dielectric permittivity applied in a layer of small or large thickness on the conductive parts subjected to an electric field that is greater than the breakdown field of the system without solid insulation. In particular, this equipment may be an electrical transformer such as a power or measurement transformer, a gas-insulated transmission line (GIL) for transporting or distributing electricity, a set of busbars, or even electrical connector/disconnectors (also called switchgear), such as a circuit breaker, a switch, a unit combining a switch with fuses, a disconnector, a grounding switch, or a contactor.

PRIOR ART

In medium- or high-voltage substation equipment, electrical insulation and, if necessary, electric arc extinction are typically performed by a gas that is confined to the inside of said equipment.

Currently, the most widely-used gas in that type of equipment is sulfur hexafluoride ($SF_6$). That gas presents dielectric strength that is relatively high, good thermal conductivity, and low dielectric losses. It is chemically inert, non-toxic for humans and animals and, after being dissociated by an electric arc, it recombines quickly and almost completely. In addition, it is non-flammable and its price is still moderate.

However, $SF_6$ has the main drawback of presenting a global warming potential (GWP) of 22,200 (relative to $CO_2$ over 100 years) and remains in the atmosphere for a time period of 3200 years, and this places it among gases having strong global warming power. $SF_6$ was therefore included in the Kyoto protocol (1997) in the list of gases for which emissions need to be limited.

The best way to limit $SF_6$ emissions consists in limiting the use of said gas, and this has led manufacturers to look for alternatives to $SF_6$.

"Simple" gases such as air or nitrogen, which do not have a negative impact on the environment present a dielectric strength that is much lower than that of $SF_6$. Thus, for example, the alternating current (AC) (50 hertz (Hz)) dielectric strengths of air and of nitrogen are substantially one-third that of $SF_6$.

As a result, the use of those "simple" gases for electrical insulation and/or electric arc extinction in medium- or high-voltage equipment would require drastically increasing the volume and/or the filling pressure of said equipment, which goes against efforts that have been made over the past few decades to develop equipment that is compact, safe for personnel, and less and less bulky.

Mixtures of $SF_6$ and nitrogen are used in order to limit the impact of $SF_6$ on the environment. The addition of $SF_6$ at 10% to 20% by volume makes it possible to significantly improve the dielectric strength of nitrogen.

Nevertheless, as a result of the high GWP of $SF_6$, the GWP of those mixtures remains very high. Thus, for example, a mixture of $SF_6$ and nitrogen having a volume ratio of 10/90, presents an AC (50 Hz) dielectric strength that is equal to 59% of that of $SF_6$, but its GWP is 8650.

Such mixtures should therefore not be considered to be gases having low environmental impact.

The same applies for mixtures described in the European patent application having publication number 0 131 922, [1], and comprising about 60 to 99.5 molar percent $SF_6$ and about 0.5 to 40 molar percent of a saturated fluorocarbon, and selected in particular from $C_2F_5CN$, $CBrClF_2$, and $c$-$C_4F_8$.

Perfluorocarbons ($C_nF_{2n+2}$ and $c$-$C_4F_8$) generally present advantageous dielectric strength properties but their GWPs are typically in a range going from 5000 to 10,000 (6500 for $CF_4$, 7000 for $C_3F_8$ and $C_4F_{10}$, 8700 for $C_4F_8$, 9200 for $C_2F_6$).

It should be noted that U.S. Pat. No. 4,547,316, [2], aims to provide an insulating gaseous mixture for electric devices that also presents considerable insulating properties and moderate toxicity for humans and animals, compared with $C_2F_5CN$. Thus, the proposed gaseous mixture comprises $C_2F_5CN$ and an alkyl nitrite more particularly selected from the group consisting of methyl nitrite, ethyl nitrite, propyl nitrite, butyl nitrite, and amyl nitrite. Such a mixture may further include $SF_6$. However, little information regarding the insulating properties of that mixture is provided.

International application WO 2008/073790, [3], describes the number of other dielectric gases that are for use in the field of electrical insulation and of electric arc extinction in medium- or high-voltage equipment.

There exist other promising alternatives from a GWP and electric characteristics point of view, such as trifluoroiodomethane ($CF_3I$). $CF_3I$ presents dielectric strength that is greater than that of $SF_6$ and this applies both to uniform fields and non-uniform fields, for a GWP that is less than 5 and a time period spent in the atmosphere of 0.005 years. Unfortunately, in addition to the fact that $CF_3I$ is expensive, it has an average occupational exposure limit (OEL) lying in the range 3 to 4 parts per million (ppm) and is classified among carcinogenic, mutagenic, and reprotoxic (CMR) category 3 substances, which is unacceptable for use on an industrial scale.

International application WO 2012/080246, [4], describes the use of one (or more) fluoroketone(s) in a mixture with air as electrical insulation and/or electric arc extinction means having low environmental impact. Because of the high boiling points for the fluids proposed, i.e. 49° C. for fluoroketone C6 and 23° C. for fluoroketone C5, those fluids are found in the liquid state at the usual minimum pressures and service temperatures for medium- and high-voltage equipment, thus obliging the inventors to add systems for vaporizing the liquid phase or for heating the outside of the equipment so as to maintain the temperature of the equipment above the liquefaction temperature for fluoroketones. That outside vaporizing system and in particular heating system complicate the design of the equipment, reduce its reliability in the event of its power supply being cut off, and give rise to additional electricity consumption that may reach one hundred megawatt hours (MWh) over the lifetime of the equipment, and that goes against the aim of reducing the environmental impact of the equipment and in particular, reducing carbon emissions. From a point of view of reliability at low temperature, in the event of the power supply being cut off at low temperature, the gaseous phase of the fluoroketone(s) liquefies thereby considerably lowering the concentration of fluoroketone(s) in the gaseous mixture and thus reducing the insulating power of the equipment, which equipment is then incapable of withstanding the voltage in the event of the power supply being restored.

It has also been proposed to use hybrid insulation systems associating gas insulation, e.g. dry air, nitrogen, or $CO_2$, with solid insulation. As described in the European patent application having publication number 1 724 802, [5], that solid insulation consists, for example, in covering the live parts presenting a strong electric field gradient with resin of the epoxy resin type or similar, and that makes it possible to reduce the field to which the live parts are subjected.

However, the insulation thus obtained is not equivalent to the insulation provided by $SF_6$ and the use of those hybrid systems requires the volume of equipment to be increased relative to the volume made possible with $SF_6$ insulation.

Relating to breaking electric arcs without $SF_6$, different solutions exist: breaking in oil, breaking in ambient air, breaking by means of a vacuum circuit-breaker. However, equipment with oil-breaking presents the major drawback of exploding in the event of non-breaking or internal failure. Equipment in which electric arcs are extinguished in ambient air is generally of large dimensions, costly, and sensitive to the environment (moisture, pollution), whereas equipment, in particular of the switch-disconnector type, having a vacuum circuit breaker is very expensive and, as a result, is not very common on the market in the field of high voltages greater than 72.5 kV.

In view of the above, the inventors have therefore generally sought to find an alternative to $SF_6$, that has low environmental impact relative to identical $SF_6$ equipment, while maintaining the characteristics of the equipment, from the point of view of its insulating and breaking abilities, close to those of $SF_6$, and without significantly increasing the size of the equipment or the pressure of the gas inside it.

In addition, the inventors have sought to maintain the service temperature ranges of the equipment close to those of equivalent $SF_6$ equipment, and to do so without external heater means.

More specifically, the inventors have sought to find an insulation system comprising at least a gas or a mixture of gases that, while presenting electrical insulation or electric arc extinction properties that are sufficient for application in the field of high-voltage equipment and that are in particular comparable to $SF_6$ equipment, also has an impact on the environment that is low or zero.

The inventors have also sought to provide an insulation system, and in particular the gas or mixture of gases included in said system, that is non-toxic for humans and animals.

They have further sought to provide an insulation system, and in particular the gas or mixture of gases included in said system, having a manufacture or purchase cost that is compatible with use on an industrial scale.

They have further sought to provide medium- or high-voltage equipment based on said insulation system, and in particular the gas or mixture of gases included in said system, having a size and pressure that are close to those of equivalent equipment insulated with $SF_6$ and that does not present liquefaction at the minimum utilization temperature without the addition of an external heat source.

DESCRIPTION OF THE INVENTION

These objects and others are achieved by the invention that proposes the use of a particular hybrid insulation system making it possible to obtain medium- or high-voltage equipment having low environmental impact.

The hybrid insulation system implemented in the context of the present invention is based on a gaseous medium comprising heptafluoroisobutyronitrile in a mixture with a neutral gas for use as a gas for electrical insulation and/or for electric arc extinction in medium- or high-voltage equipment, in combination with solid insulation, in particular of low dielectric permittivity, applied in a layer of varying thickness on the conductive parts subjected to an electric field that is greater than the breakdown field of the system without solid insulation. In fact, the medium- or high-voltage equipment of the invention presents some electrical components that are not covered in a solid dielectric layer.

In general, the present invention provides medium- or high-voltage equipment including a leaktight enclosure in which there are located electrical components covered with a solid dielectric layer of varying thickness and a gaseous medium for ensuring electrical insulation and/or for extinguishing electric arcs that are likely to occur in said enclosure, the gaseous medium comprising heptafluoroisobutyronitrile in a mixture with a dilution gas.

In the equipment of the invention, the gas insulation implements a gaseous mixture including heptafluoroisobutyronitrile.

Heptafluoroisobutyronitrile having the formula (I): $(CF_3)_2$CFCN (I), hereafter designated as i-$C_3F_7$CN, corresponds to 2,3,3,3-tetrafluoro-2-trifluoromethyl propanenitrile, with the CAS registry number: 42532-60-5, presenting a boiling point of −3.9° C. at 1013 hectopascals (hPa) (boiling point measured according to ASTM D1120-94 "Standard Test Method of Boiling Point of Engine Coolants") and a relative dielectric strength relative to $N_2$ and compared to that of $SF_6$ given in Table I below, said dielectric strength being measured at atmospheric pressure, under DC (direct current) voltage, between two steel electrodes having diameters of 2.54 centimeters (cm) and spaced apart by 0.1 cm.

TABLE I

| $N_2$ | $SF_6$ | i-$C_3F_7$CN |
|---|---|---|
| 1.0 | 2.5 | 5.5 |

Thus, heptafluoroisobutyronitrile having the formula (I) as described above, that is non-toxic, non-corrosive, non-flammable, and that presents a GWP that is low relative to that of $SF_6$, is endowed with electrical insulation or electric arc extinction properties suitable for enabling it to replace $SF_6$ as an insulation gas and/or arc-extinction gas in medium- or high-voltage equipment in a mixture with a dilution gas very advantageously, in combination with a solid insulation.

More particularly, the present invention provides hybrid insulation having low environmental impact combining (i) a gaseous mixture having low environmental impact (low GWP relative to $SF_6$) that is compatible with minimum utilization temperatures of the equipment and having breaking and thermal dissipation dielectric properties that are better than those of conventional gases such as $CO_2$, air, or nitrogen, and (ii) solid insulation of the type comprising a deposit having low dielectric permittivity deposited on the electric parts that are subjected to strong electric fields.

Above and below, the terms "medium voltage" and "high voltage" are used in the conventionally accepted manner, i.e. the term "medium voltage" refers to a voltage that is greater than 1000 volts (V) for AC and 1500 V for DC, but that does not exceed 52,000 V for AC or 75,000 V for DC, whereas the term "high voltage" refers to a voltage that is strictly greater than 52,000 V for AC and than 75,000 V for DC.

In the context of the invention, heptafluoroisobutyronitrile having the formula (I) as defined above is used in a mixture with a dilution gas that is selected from gases that meet the following four criteria:

(1) presenting a very low boiling temperature, lower than the minimum utilization temperature of the equipment;

(2) presenting dielectric strength that is greater than or equal to that of carbon dioxide in test conditions that are identical to those used for measuring the dielectric strength of said carbon dioxide (i.e. same equipment, same geometrical configuration, same operating parameters, . . . );

(3) being free from toxicity for humans and animals; and (4) presenting a GWP that is lower than that of heptafluoroisobutyronitrile so that diluting heptafluoroisobutyronitrile with the dilution gas also has the effect of lowering the environmental impact of heptafluoroisobutyronitrile, since the GWP of a gaseous mixture is a weighted average derived from the sum of the fractions by weight of each of the substances making it up multiplied by the corresponding GWPs.

In particular, a dilution gas for use in the context of the present invention is a neutral gas having a GWP that is very low, or even zero. Also, the dilution gas is, typically, carbon dioxide, having a GWP that is equal to 1, nitrogen, oxygen, or air, advantageously dry air, having a GWP that is equal to 0, or mixtures thereof. More particularly, a dilution gas for use in the context of the present invention is selected from among carbon dioxide, nitrogen, oxygen, air, advantageously dry air, and any mixture thereof.

Advantageously, heptafluoroisobutyronitrile as defined above is present in the heptafluoroisobutyronitrile/dilution gas mixture at a molar percentage ($M_{he}$) that is not less than 80% of the molar percentage M, determined by the formula (II):

$$M=(P_{he}/P_{mixture}) \times 100 \quad \text{(II)}$$

in which $P_{mixture}$ represents the total pressure of the mixture at 20° C. in the equipment and $P_{he}$ represents the partial pressure, expressed in the same units, that is equivalent at 20° C. to the saturated vapor pressure presented by heptafluoroisobutyronitrile as defined above at the minimum utilization temperature of the equipment.

As for the pressure $P_{he}$, it is approximated by the formula (III):

$$P_{he}=(SVP_{he} \times 293)/(T_{min}+273) \quad \text{(III)}$$

in which $SVP_{he}$ represents the saturated vapor pressure of heptafluoroisobutyronitrile as defined above at the minimum utilization temperature $T_{min}$ of the equipment, expressed in degrees Celsius.

Thus, the dielectric properties of the gaseous medium are the highest possible and are close to those of $SF_6$.

Advantageously, in the context of the present invention, the minimum utilization temperature $T_{min}$ is selected from 0° C., −5° C., −10° C., −15° C., −20° C., −25° C., −30° C., −35° C., −40° C., −45° C., and −50° C., and, in particular, selected from 0° C., −5° C., −10° C., −15° C., −20° C., −25° C., −30° C., −35° C., and −40° C.

In a first embodiment, the equipment is medium-voltage or high-voltage equipment in which having some of the mixture in the liquid state does not reduce insulation. In this embodiment, it is possible to use a mixture in which the heptafluoroisobutyronitrile is present at a molar percentage $M_{he}$ that is greater than the molar percentage M. The molar percentage of heptafluoroisobutyronitrile then typically lies in the range 95% to 130%, better still between 97% and 120%, ideally between 99% and 110% of the molar percentage M as defined above. Under such circumstances, the dielectric strength of the equipment should be tested with heptafluoroisobutyronitrile at a partial pressure in the gaseous mixture for which the gas does not present liquefaction at the minimum service temperature so as to validate the dielectric strength of said equipment across the whole of its temperature range.

In a second embodiment, the equipment is medium- or high-voltage equipment in which insulation can be affected by the presence of a liquid phase. In this embodiment, it is desirable for the heptafluoroisobutyronitrile/dilution gas mixture to be exclusively or almost exclusively in the gaseous state across the entire range of utilization temperatures for the equipment. It is therefore advantageous for the heptafluoroisobutyronitrile to be present in the mixture at a molar percentage ($M_{he}$) that does not exceed 100% of the molar percentage M so that it does not present a liquefaction phase at the minimum utilization temperature. Under such circumstances, the molar percentage of heptafluoroisobutyronitrile advantageously lies in the range 95% to 100% and, in particular, in the range 98% to 100% of the molar percentage M as defined above.

In order to improve overall dielectric strength, the gaseous mixture comprising heptafluoroisobutyronitrile and a dilution gas is used, in a hybrid insulation system, in combination with solid insulation that is applied as an insulating layer of varying thickness on the conductive parts that are subjected to an electric field that is greater than the breakdown field of the system without solid insulation.

The insulating layer implemented in the invention presents low relative permittivity. "Low relative permittivity" refers to relative permittivity that is less than or equal to 6. It should be recalled that the relative permittivity of a material, also known as its dielectric constant, and designated as $\in_r$, is a dimensionless quantity that may be defined by the formulas (IV) and (V) below:

$$\in_r = \in/\in_0 \quad \text{(IV), with}$$

$$\in = (e*C)/S \text{ and } \in_0 = 1/(36\pi*10^9) \quad \text{(V)}$$

in which:
- ∈ corresponds to the absolute permittivity of the material (expressed in farads per meter (F/m));
- $\in_0$ corresponds to the vacuum permittivity (expressed in F/m);
- C corresponds to the capacitance (expressed in farads (F)) of a plane capacitor comprising two parallel electrodes having placed between them a layer of material of permittivity that is to be determined, said layer representing a test piece;
- e corresponds to the distance (expressed in meters (m)) between the two parallel electrodes of the plane capacitor, which in this instance corresponds to the thickness of the test piece; and
- S corresponds to the area (expressed in square meters ($m^2$)) of each electrode constituting the plane capacitor.

In the context of the present invention, the capacitance is determined as in IEC standard 60250-ed1.0, i.e. by using a capacitor comprising two circular electrodes of diameter lying in the range 50 millimeters (mm) to 54 mm, connected to the test piece constituted by the material, said electrodes being obtained by spraying a conductive paint with a guard device. The test piece presents dimensions of 100 mm×100 mm and a thickness of 3 mm. The distance between the electrodes of the capacitor that corresponds to the above-mentioned magnitude e, is therefore 3 mm.

In addition, the capacitance is determined using an excitation level of 500 volts root mean square (V rms), at a frequency of 50 hertz (Hz), at a temperature of 23° C., and at relative humidity of 50%. The above-mentioned voltage is applied for a duration of 1 minute (min).

"Insulating/dielectric layer of varying thickness" indicates in the context of the present invention that the dielectric material, deposited or applied on the electrical components or conductive parts, presents thickness that varies as a function of the conductive part or conductive part portion on which it is deposited. The thickness of the layer does not vary while the equipment is in use but is determined during preparation of the elements constituting the equipment.

In the context of the invention, the insulating layer is applied in a layer of small or large thickness on the conductive parts subjected to an electric field that is greater than the breakdown field of the system without solid insulation.

More particularly, since the thickness of the insulating layer implemented in the context of the present invention is a function of the utilization factor of the electrical field, η, defined as the ratio of the mean electric field (U/d) divided by the maximum electric field Emax (η=U/(Emax*d)), the layer is thick for utilization factors close to 0.3, i.e. lying in the range 0.2 to 0.4 and the layer is thin for utilization factors approaching 0.9, i.e. greater than 0.5, and in particular greater than 0.6.

Figure 3:
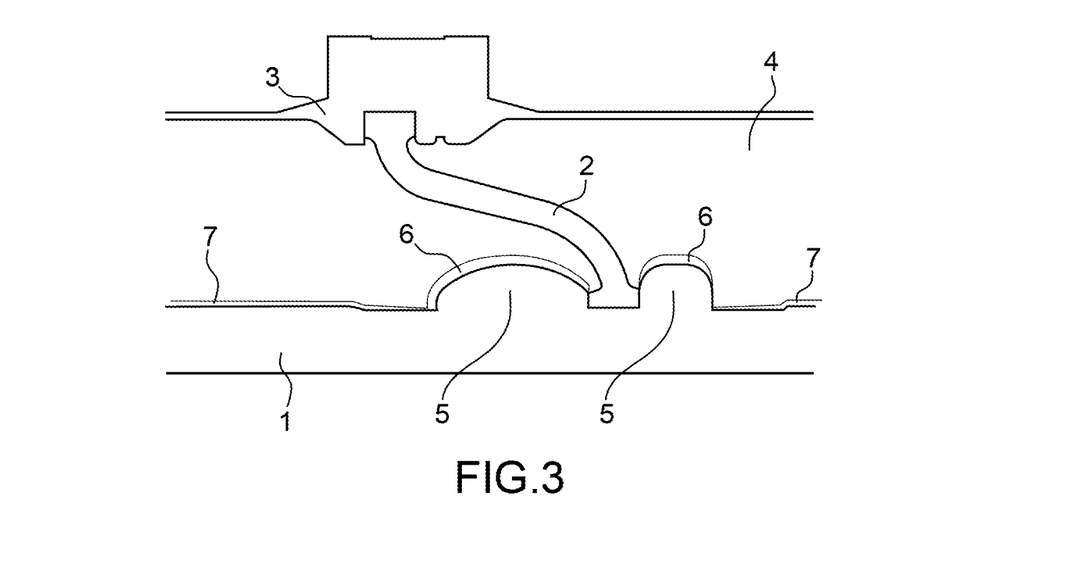
FIG. 3 is a diagrammatic view of a portion of equipment of the present invention.

With reference to FIG. 3, the thick layers (6) are typically deposited on the electrodes (5) at the position in which the utilization factor of the electric field is close to 0.3 and the thin layers (7) on the conductors (1) at the position in which the utilization factor of the electric field is greater than 0.6.

In the context of the present invention, "thick layer" refers to a layer of thickness that is greater than 1 mm and less than 10 mm and "thin layer" refers to a layer of thickness that is less than 1 mm, advantageously less than 500 micrometers (μm), in particular lying in the range 60 μm to 100 μm.

The solid insulating layer implemented in the context of the present invention may comprise a single dielectric material or a plurality of different dielectric materials. In addition, the composition of the insulating layer, i.e. the nature of the dielectric material(s) that the layer comprises may differ as a function of the conductive part or portion of conductive part on which the solid insulating layer is deposited.

In particular, in the context of the invention, the materials selected in order to make the thick insulating layers present relative permittivities that are low, i.e. less than or equal to 6. In a particular embodiment, the dielectric permittivities of the insulating materials used for making the thick solid layers present relative permittivities of about 3 or less, i.e. relative permittivities less than or equal to 4, and in particular less than or equal to 3. By way of example of materials for use in making the solid dielectric layers for the equipment of the invention that are thick, mention may be made of polytetrafluoroethylene, polyimide, polyethylene, polypropylene, polystyrene, polycarbonate, polymethyl methacrylate, polysulfone, polyetherimide, polyether ether ketone, parylene N™, Nuflon™, silicone, and epoxy resin.

As regards the materials used for making the thin layers, the materials selected in the context of the invention present relative permittivities of the order of 3, i.e. lying in the range 2 to 4 and in particular in the range 2.5 to 3.5. By way of example of materials for use in making the solid dielectric layers for the equipment of the invention that are thin, mention may be made of polytetrafluoroethylene, polyimide, polyethylene, polypropylene, polystyrene, parylene N™ and Nuflon™ and also polyamide, ethylene-monochlorotrifluoroethylene, HALAR™, and HALAR C™.

According to the invention, the equipment may be, firstly, an electrical transformer, e.g. a power transformer or a measurement transformer.

It may also be an overhead or buried gas-insulated line, or a set of busbars for transporting or distributing electricity.

It may also be an element for connection to the other equipment in the network, e.g. overhead lines or bulkhead connectors.

Finally, it may also be a connector/disconnector (also called switchgear) such as, for example, a circuit breaker, a switch, a disconnector, a unit combining a switch with fuses, a grounding switch, or a contactor.

The present invention also relates to the use of heptafluoroisobutyronitrile in a mixture with a dilution gas as defined above as a gas for electrical insulation and/or for electric arc extinction in medium- or high-voltage equipment, the components of which are covered with a solid dielectric layer of varying thickness as defined above.

Other characteristics and advantages of the invention can be seen more clearly from the additional description below, given by way of illustrative and non-limiting example, and with reference to the accompanying figures.

DETAILED DESCRIPTION OF PARTICULAR EMBODIMENTS

The invention is based on the use of a hybrid insulation system having low environmental impact, combining heptafluoroisobutyronitrile as described above, and used for the comparative examples given below with at least one dilution gas, also called neutral gas or buffer gas, of the carbon dioxide, air, nitrogen, or oxygen type, or a mixture thereof, and with solid insulation of low dielectric permittivity applied in a layer of small or large thickness on conductive parts that are subjected to an electric field that is greater than the breakdown field of the system without solid insulation.

In the present invention, the expressions "dilution gas", "neutral gas", or "buffer gas" are equivalent and may be used interchangeably.

Advantageously, heptafluoroisobutyronitrile is present in the equipment in entirely gaseous form whatever the utilization temperature of the equipment. It is therefore advisable for the pressure of the heptafluoroisobutyronitrile inside the equipment to be selected as a function of the saturated vapor pressure (SVP) presented by heptafluoroisobutyronitrile at the lowest utilization temperature of said equipment.

However, since the equipment is usually filled with gas at ambient temperature, the pressure of the heptafluoroisobutyronitrile to which reference is made in order to fill the equipment is the pressure that corresponds, at the filling temperature, e.g. 20° C., to the SVP presented by heptafluoroisobutyronitrile at the lowest utilization temperature of said equipment.

By way of example, the Table II below gives the saturated vapor pressures, referenced $SVP_{i-C3F7CN}$ and expressed in hectopascals, presented by heptafluoroisobutyronitrile at temperatures of 0° C., −5° C., −10° C., −15° C., −20° C., −25° C., −30° C., and −40° C., as well as the pressures, referenced $P_{i-C3F7CN}$ and expressed in hectopascals, which correspond at 20° C. to those saturated vapor pressures.

TABLE II

| | saturated vapor pressures of i-C₃F₇CN | |
|---|---|---|
| Temperatures | $SVP_{i-C3F7CN}$ (hPa) | $P_{i-C3F7CN}$ (hPa) |
| 0° C. | 1177 | 1264 |
| −5° C. | 968 | 1058 |
| −10° C. | 788 | 877 |
| −15° C. | 634 | 720 |
| −20° C. | 504 | 583 |
| −25° C. | 395 | 466 |
| −30° C. | 305 | 368 |
| −35° C. | 232 | 286 |
| −40° C. | 173 | 218 |

Example of Application and Filling

Depending on the equipment, the recommended pressure for filling in a medium for electric insulation and/or for electric arc extinction varies. However, it is typically of several bars (i.e. a few thousand hectopascals).

Heptafluoroisobutyronitrile is used in a mixture with a dilution gas in order to be able to obtain the recommended filling pressure level.

Thus, for example, equipment designed firstly for being used at a minimum temperature of −30° C., and secondly for being filled to 5 bars (i.e. 5000 hPa), should be filled with 0.368 bars (i.e. 368 hPa) of heptafluoroisobutyronitrile and 4.632 bars (i.e. 4632 hPa) of a dilution gas.

Such equipment is in particular high-voltage equipment of the 145 kV (kilovolt) gas-insulated equipment (GIS) type sold by Alstom under reference B65, designed for an application at −30° C. filled with a dilution gas/i-C₃F₇CN. For this equipment having a minimum application temperature of −30° C., heptafluoroisobutyronitrile should be at a pressure of 0.368 bars absolute measured at 20° C. Buffer gas should be added in order to obtain the final properties of the gas mixture. Since the partial pressure of heptafluoroisobutyronitrile is 0.368 bars absolute measured at 20° C. and the total pressure of the gas is 5 bars absolute, the molar ratio of i-C₃F₇CN is thus 0.368/5, i.e. about 7.4%.

Typically, the dilution gas is selected from among gases that present, firstly, a very low boiling temperature, that is less than or equal to the minimum utilization temperature for the equipment, and secondly, a dielectric strength that is greater than or equal to that of carbon dioxide under test conditions that are identical to those used for measuring the dielectric strength of carbon dioxide (same equipment, same geometrical configuration, same operating parameters, . . . ).

Advantageously, the dilution gas is selected from carbon dioxide having a GWP that is equal to 1, nitrogen, oxygen, air, advantageously dry air, having a GWP that is equal to 0, and mixtures thereof. In particular, the dilution gas is selected from carbon dioxide, nitrogen, air, advantageously dry air, and mixtures thereof.

In order to determine the composition of the gaseous mixture during filling, a molar percentage M is determined for heptafluoroisobutyronitrile at the recommended filling pressure of the equipment, that represents the maximum proportion of heptafluoroisobutyronitrile that the heptafluoroisobutyronitrile/dilution gas mixture should include in order for there not to be any liquid in the enclosure of the equipment. The molar percentage M is given by the formula $M=(P_{he}/P_{mixture})\times 100$, with $P_{he}$ representing the pressure, at the filling temperature (typically of the order of 20° C.), equivalent to the saturated vapor pressure SVP of heptafluoroisobutyronitrile at the minimum utilization temperature $T_{min}$ of the equipment ($P_{he}=(SVP_{he}\times 293)/(273+T_{min})$).

Then, the molar percentage $M_{he}$ for filling is chosen as a function of M. In some circumstances, it is imperative that $M_{he}$ does not exceed M in order to avoid any presence of liquid.

However, it is sometimes possible, for example at medium voltage or for some high-voltage equipment for which insulation is not affected by the presence of a liquid phase, to have a little liquid at low or very low temperature, and then $M_{he}$ may reach 110% or even 130% of M. In addition, as heptafluoroisobutyronitrile has a better dielectric strength than neutral gases, it is desirable to optimize filling using heptafluoroisobutyronitrile. Therefore, preferably, $M_{he}$ is selected so that it is not less than 80% of M, better still not less than 95% of M, better still not less than 98% of M, e.g. equal to 99% of M.

The equipment is filled by means of a gas mixer making it possible to control the ratio between heptafluoroisobutyronitrile and dilution gas, this ratio being held constant and equal to about 7.4% by pressure for the duration of filling by using a precision mass flowmeter.

Dielectric Results: Strength Tests at Power Frequency and Under a Lightning Impact at High Voltage These tests were carried out on a set of busbars of a B65 shielded substation from ALSTOM having a rated voltage of 145 kV, in accordance with IEC standard 62271-1 relating to high-voltage equipment.

The Table III below shows the results obtained for a gaseous medium consisting in a mixture of heptafluoroisobutyronitrile and of CO₂ (i-C₃F₇CN/CO₂) or of heptafluoroisobutyronitrile and of air (i-C₃F₇CN/Air) in a molar ratio of 7.4/92.6, compared to the results obtained for a gaseous medium containing only CO₂ (CO₂), only air (Air), or only SF₆ for an identical total pressure, i.e. 4 bars relative.

TABLE III

| Gaseous medium | Power frequency (kV) | Positive lightning impact (kVc) | Negative lightning impact (kVc) |
|---|---|---|---|
| i-$C_3F_7CN/CO_2$ | 362 | 694 | −653 |
| i-$C_3F_7CN$/Air | 380 | 695 | −646 |
| $CO_2$ | 176 | 366 | −310 |
| Air | 211 | 334 | −369 |
| $SF_6$ | 456 | 890 | −889 |

On the basis of the results in Table III, Tables IV, V, and VI below show the relative dielectric strengths relative to the $CO_2$ and air buffer gas and relative to $SF_6$, respectively.

TABLE IV

| Gaseous medium | Power frequency (kV) | Positive lightning impact (kVc) | Negative lightning impact (kVc) |
|---|---|---|---|
| i-$C_3F_7CN/CO_2$ | 2.1 | 1.9 | −2.1 |
| $CO_2$ | 1 | 1 | −1 |

TABLE V

| Gaseous medium | Power frequency (kV) | Positive lightning impact (kVc) | Negative lightning impact (kVc) |
|---|---|---|---|
| i-$C_3F_7CN$/Air | 1.8 | 2.1 | −1.75 |
| Air | 1 | 1 | −1 |

TABLE VI

| Gaseous medium | Power frequency (kV) | Positive lightning impact (kVc) | Negative lightning impact (kVc) |
|---|---|---|---|
| i-$C_3F_7CN/CO_2$ | 0.79 | 0.78 | −0.73 |
| i-$C_3F_7CN$/Air | 0.83 | 0.78 | −0.73 |
| $SF_6$ | 1 | 1 | −1 |

Tables IV and V show that the gaseous media consisting in mixtures of heptafluoroisobutyronitrile and of a gas endowed with dielectric properties such as carbon dioxide or dry air withstand lightning impacts at high voltage much better than said gases when they are used alone.

Table VI shows that the gaseous media consisting in mixtures of heptafluoroisobutyronitrile and of a gas endowed with dielectric properties such as carbon dioxide or dry air withstand lightning impacts at high voltage nearly as well as $SF_6$ used on its own, making it possible to replace $SF_6$ in high-voltage equipment.

Thus, for minimum service temperatures of −30° C., i.e. an absolute pressure for heptafluoroisobutyronitrile of 0.368 bars, additional tests performed on the same set of busbars of a B65 shielded substation from ALSTOM having a rated voltage of 145 kV, and in accordance with IEC standard 62271-1 relating to high-voltage equipment show that mixtures of heptafluoroisobutyronitrile and $CO_2$ achieve dielectric equivalence with $SF_6$ at 4 bars relative for a mixture at a total pressure of 6 bars, i.e. an i-$C_3F_7CN/CO_2$ mixture ratio of 0.368/7=5.25%.

Toxicity

Heptafluoroisobutyronitrile presents no specific toxicity for humans and has an $LC_{50}$ (lethal concentration, 50%) that is greater than 15000 ppm. In addition, by diluting it by about 5% (5.25% precisely) in $CO_2$ or in air, toxicity is further reduced in the volume ratio of the mixture in order to reach an $LC_{50}$ of the order of 78000 ppm for the mixture and which classifies it in the field of gases considered to be "practically non-toxic" (toxicity classification 5, according to the Hodge and Sterner toxicity scale).

Flammability

Pure heptafluoroisobutyronitrile, as well as the i-$C_3F_7CN/CO_2$ and i-$C_3F_7CN$/Air mixtures are non-flammable.

Environmental Impact/GWP

The global warming potential or GWP of heptafluoroisobutyronitrile is of the order of 2400, i.e. 9.5 times lower than that of $SF_6$ and more than 3.1 times lower than that of a mixture of $SF_6$ and nitrogen at 10% by volume of $SF_6$.

Heptafluoroisobutyronitrile presents a molar mass of 195 grams per mole (g/mol).

The GWP of the gaseous mixture is calculated according to the May 17, 2006 Regulation (EC) No 842/2006 of the European Parliament and of the Council on certain fluorinated greenhouse gases, Part 2 "Method of calculating the total global warming potential (GWP) for a preparation". According to that text, the GWP factor of a gaseous mixture is an average weighted by the fraction by weight of each substance multiplied by its GWP factor.

In use in a mixture at 5.25 molar percent in $CO_2$ (44 g/mol), the fraction by weight of heptafluoroisobutyronitrile is 19.7%, therefore the GWP of the mixture is of the order of 474, which represents a reduction of the order of 98% compared with the carbon equivalent for pure $SF_6$ (Table VII).

TABLE VII

| Gas | Molar mass | GWP | molar % (% P) | Weight fraction (% w) |
|---|---|---|---|---|
| i-$C_3F_7CN$ | 195 | 2400 | 5.3% | 19.7% |
| $CO_2$ | 44 | 1 | 94.7% | 80.3% |

GWP of mixture = 474
Reduction/$SF_6$ = 97.9%

In use in a mixture at 5.25 molar percent in air (28.8% g/mol), the fraction by weight of heptafluoroisobutyronitrile is 27%, therefore the GWP of the mixture is of the order of 655, which represents a reduction of the order of 97% compared with the carbon equivalent for pure $SF_6$ (Table VIII).

TABLE VIII

| Gas | Molar mass | GWP | molar % (% P) | Weight fraction (% w) |
|---|---|---|---|---|
| i-$C_3F_7CN$ | 195 | 2400 | 5.3% | 27.3% |
| Air | 28.8 | 0 | 94.7% | 72.7% |

GWP of mixture = 655
Reduction/$SF_6$ = 97.1%

End of Life

At the end of its life or after circuit-breaking tests, the gas can be recovered by means of conventional recovery techniques using a compressor and a vacuum pump. The heptafluoroisobutyronitrile is then separated from the buffer gas using a zeolite capable of trapping only the smaller-sized buffer gas; alternatively, a selective separation membrane allows the buffer gas such as nitrogen, $CO_2$, or air to escape and retains the heptafluoroisobutyronitrile, which has a greater size and molar mass; any other option may be envisaged.

Association with Solid Insulation

So as to obtain dielectric equivalence with $SF_6$, without reducing its performance at low temperature or increasing the total amount of pressure, the gaseous mixture presented above is used in combination with solid insulation having low dielectric permittivity that is applied on those conductive parts that are subjected to an electric field that is greater than the breakdown field of the system without solid insulation.

The solid insulation implemented in the context of the present invention is in the form of a layer of thickness that varies for a given piece of equipment. The implemented insulating layer may present low thickness (thin or fine layer), or high thickness (thick layer).

Since the thickness of the insulating layer is a function of the utilization factor of the electrical field, η, defined as the ratio of the mean electric field (U/d) divided by the maximum electric field Emax (η=U/(Emax*d)), the layer is thick for utilization factors close to 0.3, and the layer is thin for utilization factors approaching 0.9.

Figure 1:
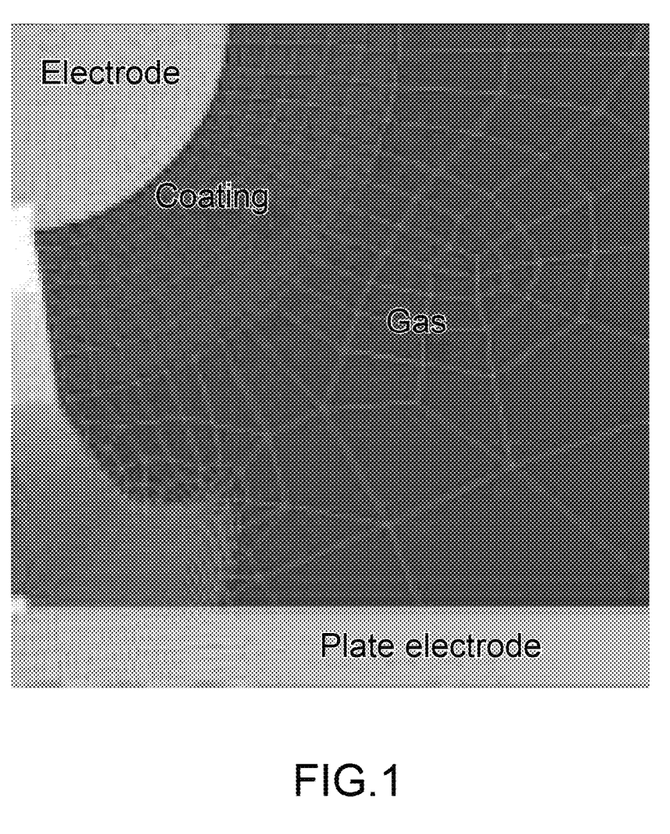
FIG. 1 shows a diagram used for performing the dielectric calculation.

The calculations presented in FIG. 1 call attention to the reduction of the maximum electric field to which the insulation gas is subjected for mixed insulation combining solid insulation applied in a layer on the parts subjected to high electric fields, typically at the electrodes.

This solution therefore makes it possible to reduce, in significant manner, the maximum electric field on the gaseous phase and thus to increase the total dielectric strength of the "mixed" insulation that is made up in series of solid insulation and of gas insulation. This phenomenon of reducing the electrical field acting on the gaseous phase is more pronounced when the dielectric permittivity of the solid layer is low.

In the example presented, hybrid insulation is composed of solid spherical insulation of a thickness of 10 mm in combination with gas insulation of a thickness of 15 mm, the total insulation being of a thickness of 25 mm. Electric field calculation was performed for two different configurations of solid insulation presenting significantly different relative permittivities, typically of 5.3 and 2.9.

Figure 2:
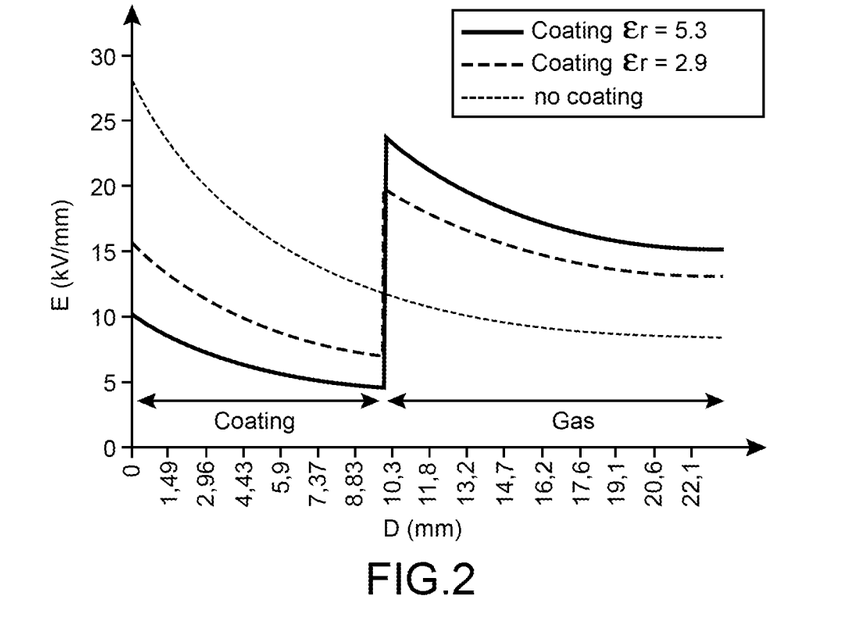
FIG. 2 shows the profile of the electric field in the solid insulation layer and the gaseous phase for a relative permittivity of 2.9 and 5.3.

In this precise example, the factor by which the electric field on the gaseous phase is reduced is of the order of 15% for solid insulation having dielectric permittivity of 5.3 and of the order of 30% for solid insulation having dielectric permittivity of 2.9 (FIG. 2). In the context of the invention, a material presenting a relative permittivity of the order of 3, or less, is preferred for making the thick layers on the electrodes.

These dielectric calculations have been confirmed by measurements performed on equipment presenting an improvement factor of the order of 20% in dielectric strength (relative to a non-covered electrode) for a thick layer made of epoxy resin presenting relative permittivity of the order of 5 and an improvement factor of the order of 30% (relative to a non-covered electrode) in dielectric strength for a thick layer made of silicone presenting relative permittivity of the order of 3.

For the thin layers made on the electrical parts subjected to weaker electric fields, the materials used present dielectric permittivities of the order of 3 and are applied in the form of thin layers having thickness that is typically of the order of 60 μm to 100 μm. The results obtained using equipment with thin layer deposits of the order of 60 μm to 100 μm of Nuflon™ (relative permittivity of 2.7) or parylene N™ (relative permittivity of 2.65) deposited on electrodes showing improvement factors for dielectric strength of the order of 8% relative to a non-covered electrode.

In the context of the present invention, the equipment shown in part in a diagram in FIG. 3 has a metal enclosure (3) with an insulator (2) and electrical components including a conductor (1) and electrodes (5). In said equipment, the hybrid insulation is constituted both by gas insulation consisting of a gaseous mixture (4) under pressure of heptafluoroisobutyronitrile and of a dilution gas as defined above and by solid insulation present in the form of a thick dielectric layer (6) or of a thin dielectric layer (7) as defined above.

REFERENCES

[1] European patent application, in the name of Mitsubishi Denki Kabushiki Kaisha, having publication number 0 131 922 on Jan. 23, 1985.
[2] U.S. Pat. No. 4,547,316, in the name of Mitsubishi Denki Kabushiki Kaisha, published on Oct. 15, 1985.
[3] International application WO 2008/073790, in the name of Honeywell International Inc., published on Jun. 19, 2008.
[4] International application WO 2012/080246, in the name of ABB Technology AG., published on Jun. 21, 2012.
[5] European patent application, in the name of Mitsubishi Denki Kabushiki Kaisha, having publication number 1 724 802 on Nov. 22, 2006.

What is claimed is:

1. Medium- or high-voltage equipment including a leak tight enclosure in which there are located electrical components covered with a solid dielectric layer of varying thickness and a gaseous medium for providing electrical insulation and/or for extinguishing electric arcs that are likely to occur in said enclosure, the equipment being characterized in that the gaseous medium comprises heptafluoroisobutyronitrile in a mixture with carbon dioxide,
wherein, the thickness of said solid dielectric layer being a function of the utilization factor of the electric field, η, defined as the ratio of the mean electric field (U/d) divided by the maximum electric field Emax (η=U/(Emax*d)),
wherein said solid dielectric layer is a thick layer presenting a thickness greater than 1 mm and less than 10 mm for utilization factors lying in the range 0.2 to 0.4 and the material(s) selected for making said thick solid dielectric layer present relative permittivity that is less than or equal to 6, and
wherein said solid dielectric layer is a thin layer presenting a thickness lying in the range 60 μm to 500 μm for utilization factors greater than 0.5 and the material(s) selected for making said thin solid dielectric layer present relative permittivity lying in the range 2 to 4.

2. Equipment according to claim 1 wherein said heptafluoroisobutyronitrile is present in the heptafluoroisobutyronitrile/carbon dioxide mixture at a molar percentage ($M_{he}$) that is not less than 80% of the molar percentage M, determined by the formula (II):

$$M=(P_{he}/P_{mixture})\times 100 \quad (II)$$

in which $P_{mixture}$ represents the total pressure of the mixture at 20° C. in the equipment and $P_{he}$ represents the partial pressure, expressed in the same units, that is equivalent at 20° C. to the saturated vapor pressure presented by heptafluoroisobutyronitrile as defined above at the minimum utilization temperature of the equipment.

3. Equipment according to claim 1, wherein said heptafluoroisobutyronitrile is present in the heptafluoroisobutyronitrile/carbon dioxide mixture at a molar percentage ($M_{he}$) that lies in the range 95% to 130% of the molar percentage M determined by the formula (II):

$$M=(P_{he}/P_{mixture})\times 100 \qquad (II)$$

in which $P_{mixture}$ represents the total pressure of the mixture at 20° C. in the equipment and $P_{he}$ represents the partial pressure, expressed in the same units, that is equivalent at 20° C. to the saturated vapor pressure presented by heptafluoroisobutyronitrile as defined above at the minimum utilization temperature of the equipment, said equipment being medium-voltage or high-voltage equipment in which having some of the mixture in the liquid state does not reduce insulation.

4. Equipment according to claim 1, wherein said heptafluoroisobutyronitrile is present in the heptafluoroisobutyronitrile/carbon dioxide mixture at a molar percentage ($M_{he}$) that lies in the range 95% to 100% of the molar percentage M determined by the formula (II):

$$M=(P_{he}/P_{mixture})\times 100 \qquad (II)$$

in which $P_{mixture}$ represents the total pressure of the mixture at 20° C. in the equipment and $P_{he}$ represents the partial pressure, expressed in the same units, that is equivalent at 20° C. to the saturated vapor pressure presented by heptafluoroisobutyronitrile as defined above at the minimum utilization temperature of the equipment, said equipment being medium-voltage or high-voltage equipment in which insulation may be affected by the presence of a liquid phase.

5. Equipment according to claim 1, wherein the material(s) selected for making said thick solid dielectric layer present relative permittivity that is less than or equal to 4.

6. Equipment according to claim 1, wherein said material(s) presenting relative permittivity that is less than or equal to 6 are selected from polytetrafluoroethylene, polyimide, polyethylene, polypropylene, polystyrene, polycarbonate, polymethyl methacrylate, polysulfone, polyetherimide, polyether ether ketone, parylene N™, Nuflon™, silicone, and epoxy resin.

7. Equipment according to claim 1, characterized in that said material(s) presenting relative permittivity lying in the range 2 to 4 are selected from polytetrafluoroethylene, polyimide, polyethylene, polypropylene, polystyrene, polyamide, ethylene-monochlorotrifluoroethylene, parylene N™, Nuflon™, HALAR™, and HALAR C™.

8. Equipment according to claim 1, wherein said equipment is a gas-insulated electrical transformer, a gas-insulated line for transporting or distributing electricity, or a connector/disconnector.

9. Equipment according to claim 1, wherein said heptafluoroisobutyronitrile is present in the heptafluoroisobutyronitrile/carbon dioxide mixture at a molar percentage ($M_{he}$) that lies in the range 97% to 120 of the molar percentage M determined by the formula (II):

$$M=(P_{he}/P_{mixture})\times 100 \qquad (II)$$

in which $P_{mixture}$ represents the total pressure of the mixture at 20° C. in the equipment and $P_{he}$ represents the partial pressure, expressed in the same units, that is equivalent at 20° C. to the saturated vapor pressure presented by heptafluoroisobutyronitrile as defined above at the minimum utilization temperature of the equipment, said equipment being medium-voltage or high-voltage equipment in which having some of the mixture in the liquid state does not reduce insulation.

10. Equipment according to claim 1, wherein said heptafluoroisobutyronitrile is present in the heptafluoroisobutyronitrile/carbon dioxide mixture at a molar percentage ($M_{he}$) that lies in the range 99% to 110% of the molar percentage M determined by the formula (II):

$$M=(P_{he}/P_{mixture})\times 100 \qquad (II)$$

in which $P_{mixture}$ represents the total pressure of the mixture at 20° C. in the equipment and $P_{he}$ represents the partial pressure, expressed in the same units, that is equivalent at 20° C. to the saturated vapor pressure presented by heptafluoroisobutyronitrile as defined above at the minimum utilization temperature of the equipment, said equipment being medium-voltage or high-voltage equipment in which having some of the mixture in the liquid state does not reduce insulation.

11. Equipment according to claim 1, wherein said heptafluoroisobutyronitrile is present in the heptafluoroisobutyronitrile/carbon dioxide mixture at a molar percentage ($M_{he}$) that lies in the range 98% to 100% of the molar percentage M determined by the formula (II):

$$M=(P_{he}/P_{mixture})\times 100 \qquad (II)$$

in which $P_{mixture}$ represents the total pressure of the mixture at 20° C. in the equipment and $P_{he}$ represents the partial pressure, expressed in the same units, that is equivalent at 20° C. to the saturated vapor pressure presented by heptafluoroisobutyronitrile as defined above at the minimum utilization temperature of the equipment, said equipment being medium-voltage or high-voltage equipment in which insulation may be affected by the presence of a liquid phase.

12. Equipment according to claim 1, wherein the material(s) selected for making said thick solid dielectric layer present relative permittivity that is less than or equal to 3.

13. Equipment according to claim 1 wherein, the thickness of said solid dielectric layer being a function of the utilization factor of the electric field, η, defined as the ratio of the mean electric field (U/d) divided by the maximum electric field Emax (η=U/(Emax*d)), said solid dielectric layer is a thin layer presenting a thickness lying in the range 60 μm to 100 μm for utilization factors greater than 0.5.

14. Equipment according to claim 1, wherein the material(s) selected for making said thin solid dielectric layer present relative permittivity lying in the range between 2.5 to 3.5.

* * * * *